US012285863B2

United States Patent
Xu

(10) Patent No.: US 12,285,863 B2
(45) Date of Patent: Apr. 29, 2025

(54) ROBOT CONTROL METHOD AND APPARATUS, ELECTRONIC DEVICE, STORAGE MEDIUM, AND ROBOT

(71) Applicant: Beijing Xiaomi Robot Technology Co., Ltd., Beijing (CN)

(72) Inventor: Zhe Xu, Beijing (CN)

(73) Assignee: Beijing Xiaomi Robot Technology Co., Ltd., Beijing (CN)

( * ) Notice: Subject to any disclaimer, the term of this patent is extended or adjusted under 35 U.S.C. 154(b) by 188 days.

(21) Appl. No.: 18/087,265

(22) Filed: Dec. 22, 2022

(65) Prior Publication Data

US 2024/0042599 A1 Feb. 8, 2024

(30) Foreign Application Priority Data

Aug. 2, 2022 (CN) .......................... 202210923975.6

(51) Int. Cl.
 B25J 9/16 (2006.01)
 B62D 57/032 (2006.01)

(52) U.S. Cl.
 CPC .......... B25J 9/1602 (2013.01); B62D 57/032 (2013.01)

(58) Field of Classification Search
 CPC ....... B62D 57/032; B25J 9/1602; B25J 9/161; B25J 9/1664
 See application file for complete search history.

(56) References Cited

U.S. PATENT DOCUMENTS

| | | | | |
|---|---|---|---|---|
| 2008/0046123 | A1* | 2/2008 | Takenaka | B62D 57/032 901/1 |
| 2016/0052574 | A1* | 2/2016 | Khripin | B25J 9/1694 901/1 |
| 2021/0323149 | A1* | 10/2021 | Graber-Tilton | B25J 9/1653 |
| 2021/0331317 | A1* | 10/2021 | Whitman | B62D 57/024 |
| 2024/0017404 | A1* | 1/2024 | Chen | B25J 9/1628 |

OTHER PUBLICATIONS

Raiola, A Simple Yet Effective Whole-Body Locomotion Framework for Quadruped Robots (Year: 2020).*
A_Simple_Yet_Effective_Whole-Body_Locomotion_Framework_for_Quadruped_Robots (Year: 2020).*
European Patent Application No. 22216813.0, Search and Opinion dated Aug. 16, 2023, 7 pages.
Seungmoon, S et al. "Regulating Speed and Generating Large Speed Transitions in a Neuromuscular Human Walking Model", IEEE International Conference on Robotics and Automation, May 2012, pp. 511-516.
Harding, M. et al. "Augmented Neuromuscular Gait Controller Enables Real-time Tracking of Bipedal Running Speed", 7th IEEE International Conference on Biomedical Robotics and Biomechatronics, Aug. 2018, pp. 364-371.

* cited by examiner

*Primary Examiner* — Adam R Mott
*Assistant Examiner* — Sagar Kc
(74) *Attorney, Agent, or Firm* — Cozen O'Connor

(57) ABSTRACT

A robot control method includes: acquiring target speed information of a robot at a next moment during walking of the robot; and adjusting a step frequency of the robot according to the target speed information and a current state of the robot. An apparatus for controlling a robot and several methods for determining whether the robot meets a step frequency switching condition are provided.

16 Claims, 7 Drawing Sheets

ROBOT CONTROL METHOD AND APPARATUS, ELECTRONIC DEVICE, STORAGE MEDIUM, AND ROBOT

CROSS-REFERENCE TO RELATED APPLICATION

This application is based on and claims priority to Chinese Patent Application No. 202210923975.6, filed on Aug. 2, 2022, the entire contents of which are incorporated herein by reference.

BACKGROUND

For a biped robot, a quadruped robot, a hexapod robot, and other types of robots, when the robots walk at low speeds or in place, walking at relatively low step frequencies can save energy and reduce noise. However, when walking at the low frequency, the robot cannot reach a relatively high walking speed due to limitations of swing speeds and swing positions of legs. Therefore, when walking at a high speed, the robot needs to walk at a relatively high step frequency to reach the relatively high walking speed.

SUMMARY

The present disclosure relates to a field of robots, and in particular, to a robot control method and apparatus, an electronic device, a storage medium, and a robot.

An embodiment of a first aspect of the present disclosure provides a robot control method. The method includes: acquiring target speed information of a robot at a next moment during walking of the robot; and adjusting a step frequency of the robot according to the target speed information and a current state of the robot.

An embodiment of a second aspect of the present disclosure provides a robot control apparatus. The apparatus including: a first acquisition module configured to acquire target speed information of a robot at a next moment during walking of the robot; and an adjustment module configured to adjust a step frequency of the robot according to the target speed information and a current state of the robot.

An embodiment of a third aspect of the present disclosure provides an electronic device. The electronic device includes: a processor; and a memory configured to store an instruction executable by the processor. The processor is configured to execute the instruction to perform a robot control method. The method includes: acquiring target speed information of a robot at a next moment during walking of the robot; and adjusting a step frequency of the robot according to the target speed information and a current state of the robot.

Additional aspects and advantages of the present disclosure will be given in part in the following descriptions, and will become apparent in part from the following descriptions, or be learned from the practice of the present disclosure.

BRIEF DESCRIPTION OF THE DRAWINGS

The above and/or additional aspects and advantages of the present disclosure will become apparent and readily appreciated from the following descriptions of embodiments made with reference to the drawings, in which.

DETAILED DESCRIPTION

Figure 1:
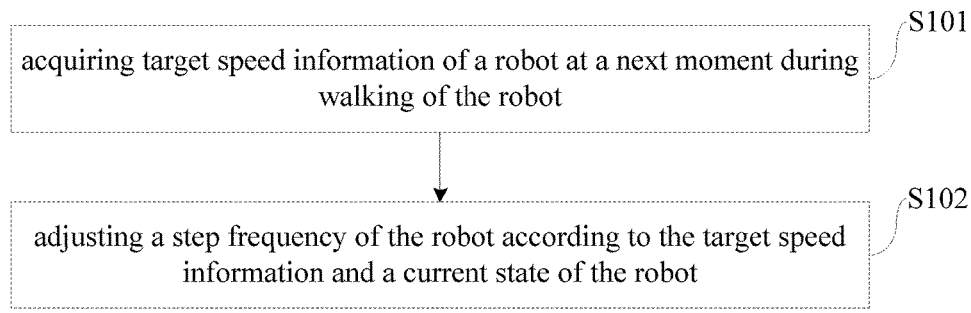
FIG. 1 is a schematic flow chart of a robot control method according to an embodiment of the present disclosure.

Illustrative embodiments will be described in detail herein, examples of which are shown in the accompanying drawings. When the following description relates to the accompanying drawings, unless otherwise specified, the same or similar elements are denoted by the same numerals in different accompanying drawings. Implementations described in the following illustrative embodiments do not represent all implementations consistent with the present disclosure. Instead, they are merely examples of apparatuses and methods consistent with some aspects of the embodiments of the present disclosure as recited in the appended claims.

The terms used in the embodiments of the present disclosure are intended only to describe particular embodiments and are not intended to limit the embodiments of the present disclosure. The singular forms of "a/an" and "the" used in the embodiments and the appended claims of the present disclosure are also intended to include plural forms, unless otherwise clearly specified in the context. It should be further understood that the term "and/or" used herein refers to and includes any and all possible combinations of one or more of relevant listed items.

It should be understood that, although the embodiments of the present disclosure may use terms such as first, second, and third to describe various kinds of information, the information should not be limited to these terms. These terms are only intended to differentiate information of the same type. For example, without departing from the scope of the embodiments of the present disclosure, first information may also be referred to as second information, and similarly, second information may also be referred to as first information. Depending on the context, the term "if" as used here may be interpreted as "at the time of . . . ," "when . . . ," or "in response to determination."

Embodiments of the present disclosure are described in detail below, examples of which are shown in the accompanying drawings, wherein the same or similar elements are denoted by the same or similar reference numerals throughout the descriptions. The embodiments described below with reference to the drawings are illustrative and intended to explain the present disclosure, but shall not be construed to limit the present disclosure.

Faced with different scenarios, a robot needs to walk at different speeds. When a walking speed of the robot changes, a step frequency of the robot also needs to be adjusted accordingly. It is difficult to realize an automatic adjustment of the step frequency, and thus a requirement of a variable-speed walking scenario cannot be satisfied.

A robot control method and apparatus, an electronic device, a storage medium, and a robot according to the embodiments of the present disclosure are described below with reference to the drawings.

FIG. 1 is a schematic flow chart of a robot control method according to an embodiment of the present disclosure. As shown in FIG. 1, the method includes the following steps.

At step S101, target speed information of a robot at a next moment is acquired during walking of the robot.

The target speed information includes a walking speed of the robot at the next moment.

The robot in the embodiment of the present disclosure may be a biped robot, a quadruped robot, a hexapod robot, or the like, which is not limited herein.

Prior to adjustment of a step frequency of the robot, an automatic step frequency change function of the robot may be enabled, so as to acquire the target speed information of the robot at the next moment after the function is enabled.

In some embodiments, during the walking of the robot, a user may send a speed instruction to the robot through a remote control or another device to instruct the robot to change the speed.

In some other embodiments, during walking of the robot by autonomous navigation, when there is a need to change a current walking speed, a server may send a speed instruction to the robot to instruct the robot to change the speed.

In yet other embodiments, during the walking of the robot, an upper module of the robot may send a speed instruction to the robot to instruct the robot to change the speed. The upper module may be a control center module of the robot.

It is to be noted that the speed instruction in the embodiment of the present disclosure includes the target speed information of the robot at the next moment.

At step S102, a step frequency of the robot is adjusted according to the target speed information and a current state of the robot.

The current state of the robot includes a limb state, a speed state, a pose state of the robot, and the like.

A step frequency of the robot at the next moment may be determined according to the walking speed of the robot at the next moment, and it is determined whether to adjust a current step frequency according to a current limb state, a current speed state, and a current pose state of the robot, so as to adjust the current step frequency of the robot to a step frequency corresponding to the walking speed at the next moment when it is determined that the current step frequency is adjusted.

Further, after the step frequency of the robot is adjusted, the robot may be controlled through a controller to make a corresponding gait according to the adjusted step frequency, so that the robot can reach the adjusted step frequency.

The gait in the embodiment of the present disclosure refers to a walking pose of the robot, and the step frequency refers to a frequency of the robot's step.

In some embodiments, the controller may be a Model Predictive Control (MPC)+Whole Body Control (WBC) controller.

In the embodiment of the present disclosure, the target speed information of the robot at the next moment is acquired during the walking of the robot, and the step frequency of the robot is adjusted according to the target speed information and the current state of the robot. In the embodiment of the present disclosure, during the walking of the robot, when the speed needs to be changed, the robot can automatically adjust the step frequency according to the speed at the next moment and the current state, so as to change the walking speed to meet a requirement of a variable-speed walking scenario.

Figure 2:
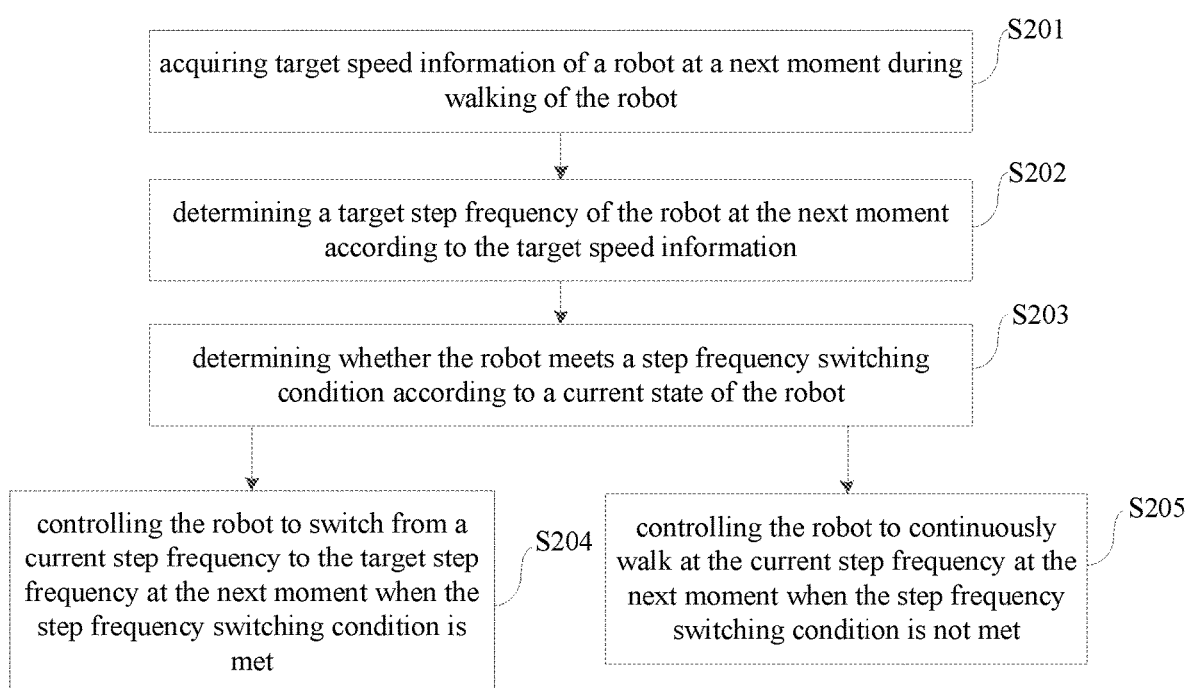
FIG. 2 is a schematic flow chart of a robot control method according to an embodiment of the present disclosure.

FIG. 2 is a schematic flow chart of a robot control method according to an embodiment of the present disclosure. As shown in FIG. 2, the method includes the following steps.

At step S201, target speed information of a robot at a next moment is acquired during walking of the robot.

Step S201 in the embodiment of the present disclosure is the same as step S101 in the above embodiment, and will not be described in details herein again.

At step S202, a target step frequency of the robot at the next moment is determined according to the target speed information.

The faster the robot walks, the higher the step frequency is. The more slowly the robot walks, the lower the step frequency is. Therefore, a certain mapping relationship exists between the walking speeds and the step frequencies of the robot. After the target speed information is acquired, the target step frequency corresponding to the target speed information may be determined according to the mapping relationship between the walking speeds and the step frequencies.

At step S203, it is determined whether the robot meets a step frequency switching condition according to a current state of the robot.

In some embodiments, it may be determined whether the robot meets the step frequency switching condition according to a supporting state of each leg of the robot.

In some other embodiments, it may be determined whether the robot meets the step frequency switching condition according to a speed state of the robot.

At step S204, the robot is controlled to switch from a current step frequency to the target step frequency at the next moment when the step frequency switching condition is met.

At step S205, the robot is controlled to continuously walk at the current step frequency at the next moment when the step frequency switching condition is not met.

When it is determined that the robot meets the step frequency switching condition, the robot is controlled to switch from the current step frequency to the target step frequency at the next moment and to walk at the target step frequency. When it is determined that the robot does not meet the step frequency switching condition, the robot is controlled to continuously walk at the current step frequency at the next moment.

In the embodiment of the present disclosure, the target speed information of the robot at the next moment is acquired during the walking of the robot, the target step frequency of the robot at the next moment is determined according to the target speed information, it is determined whether the robot meets the step frequency switching condition according to the current state of the robot, the robot is controlled to switch from the current step frequency to the target step frequency at the next moment when the step frequency switching condition is met, and the robot is controlled to continuously walk at the current step frequency at the next moment when the step frequency switching condition is not met. In the embodiment of the present disclosure, the step frequency switching condition provides a decision-making basis for step frequency switching of the robot, which can prevent incorrect switching. In addition, the step frequency of the robot at the next moment is acquired through the speed at the next moment, so as to ensure that the robot can reach the speed at the next moment after switching to the step frequency at the next moment, which improves the accuracy of the step frequency switching.

Figure 3:
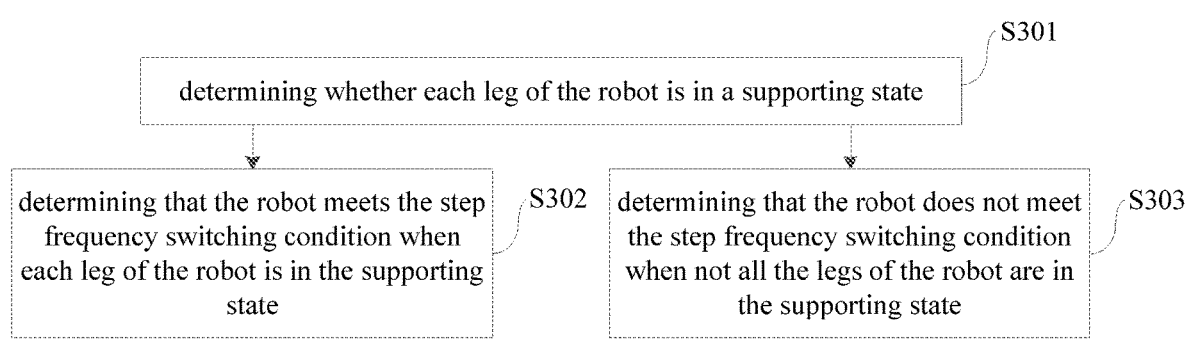
FIG. 3 is a schematic flow chart of another robot control method according to an embodiment of the present disclosure.

FIG. 3 is a schematic flow chart of a robot control method according to an embodiment of the present disclosure. On the basis of the above embodiments, a solution of determining whether the robot meets the step frequency switching condition is described further with reference to FIG. 3. The method includes the following steps.

At step S301, it is determined whether each leg of the robot is in a supporting state.

During the walking of the robot, if the robot changes the step frequency before completing a current step, a foot portion of the robot may change abruptly, thus resulting in a discontinuous foot track of the robot. In order to prevent such a situation, the robot is required to change the step frequency at the moment of completing the current step.

A quadruped robot is taken as an example below for illustration.

Figure 4:
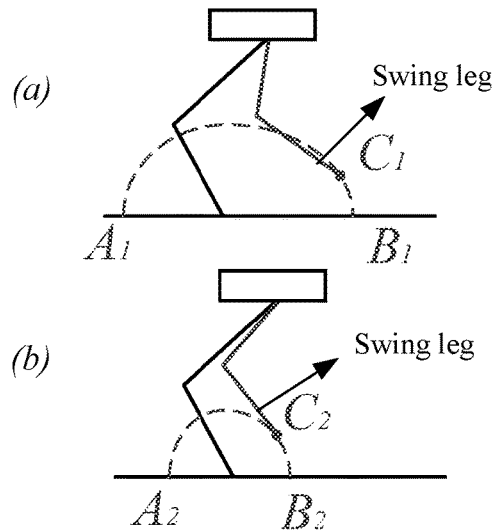
FIG. 4 is a schematic view of a robot when walking.

As shown in FIG. 4, FIG. 4(a) shows a gait with a cycle of 600 ms, and FIG. 4(b) shows a gait with a cycle of 300 ms. If the two gaits are at a same speed, a step length $A_1B_1$ in FIG. 4(a) is twice a step length $A_2B_2$ in FIG. 4(b). It is assumed that swing legs in the drawing are at 90% of their respective swing phases. If the gait with the cycle of 300 ms is changed into the gait with the cycle of 600 ms, the position of the corresponding swing leg will change from $C_2$ to $C_1$, that is, the foot portion of the swing leg will change abruptly. Therefore, the switching of the step frequency is required to be performed when each leg is a support leg, that is, when each leg is in the supporting state.

In some embodiments, a landing moment at which all the legs of the robot land is determined according to the current step frequency of the robot, and it is determined that each leg of the robot is in the supporting state in response to that a current moment of the robot reaches the landing moment.

In some other embodiments, pressure data of each leg of the robot is acquired, and it is determined that each leg of the robot is in the supporting state in response to that the pressure data of each leg is larger than a set pressure value.

At step S302, it is determined that the robot meets the step frequency switching condition when each leg of the robot is in the supporting state.

At step S303, it is determined that the robot does not meet the step frequency switching condition when not all the legs of the robot are in the supporting state.

It is determined whether each leg of the robot is in the supporting state. If yes, it is determined that the robot meets the step frequency switching condition, and if not, it is determined that the robot does not meet the step frequency switching condition.

In the embodiment of the present disclosure, it is determined whether each leg of the robot is in the supporting state, it is determined that the robot meets the step frequency switching condition when each leg of the robot is in the supporting state, and it is determined that the robot does not meet the step frequency switching condition when not all the legs of the robot are in the supporting state. In the embodiment of the present disclosure, the step frequency of the robot is switched when each leg of the robot is in the supporting state, so as to ensure stability and continuity of the walking of the robot, thus preventing an abrupt change in the foot track during the walking, which otherwise will affect the stability and continuity of the walking of the robot.

Figure 5:
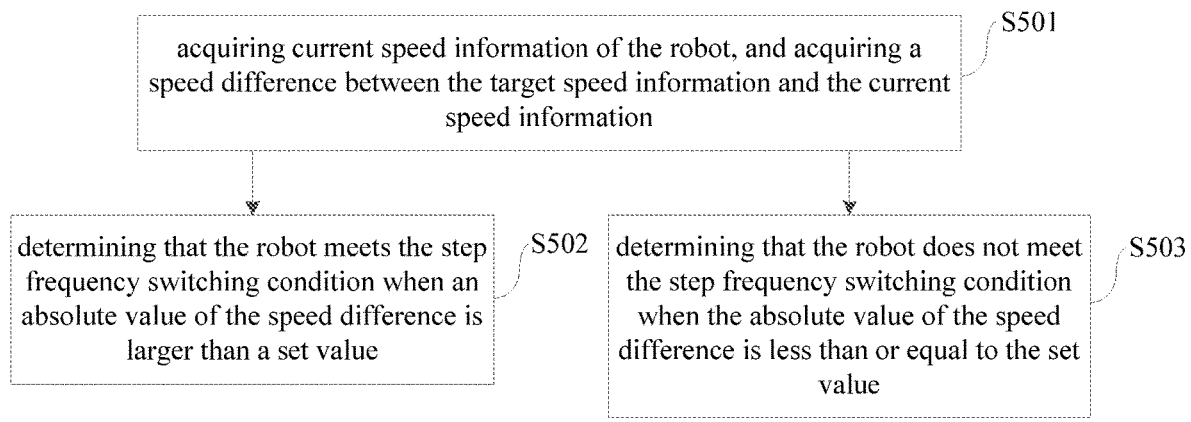
FIG. 5 is a schematic flow chart of another robot control method according to an embodiment of the present disclosure.

FIG. 5 is a schematic flow chart of a robot control method according to an embodiment of the present disclosure. On the basis of the above embodiments, another solution of determining whether the robot meets the step frequency switching condition is described further with reference to FIG. 5. The method includes the following steps.

At step S501, current speed information of the robot is acquired, and a speed difference between the target speed information and the current speed information is acquired.

At step S502, it is determined that the robot meets the step frequency switching condition when an absolute value of the speed difference is larger than a set value.

At step S503, it is determined that the robot does not meet the step frequency switching condition when the absolute value of the speed difference is less than or equal to the set value.

In an actual application scenario, if a fixed speed is taken as a change condition of the step frequency, when a given speed changes repeatedly around this speed, the step frequency of the robot may also change repeatedly, resulting in excessively frequent switching of the step frequency of the robot and affecting the normal walking of the robot.

In order to solve the above problem, in the embodiment of the present disclosure, the speed difference between the target speed information and the current speed information is taken as a judgment condition of switching the step frequency of the robot. In the embodiment of the present disclosure, it may be judged whether the absolute value of the speed difference is larger than the set value. If yes, it is determined that the robot meets the step frequency switching condition, and if not, it is determined that the robot does not meet the step frequency switching condition.

Figure 6:
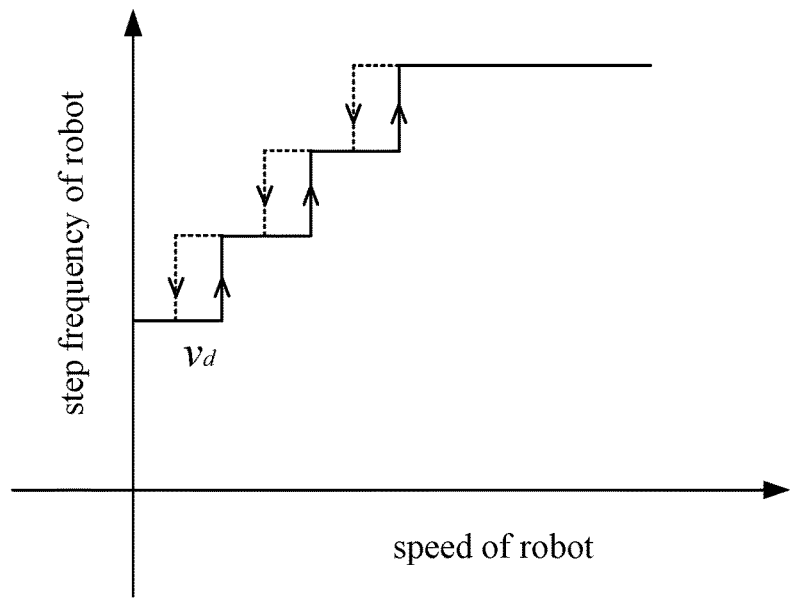
FIG. 6 is a schematic diagram of a step frequency adjustment principle.

As shown in FIG. 6, $\nu_d$ denotes the set value. When the walking of the robot is accelerated, if a speed difference between a speed at a next moment and a current speed of the robot is larger than $\nu_d$, the step frequency of the robot is increased to enable the robot to reach the speed at the next moment. When the walking of the robot is decelerated, if a speed difference between a current speed and a speed at a next moment of the robot is larger than $\nu_d$, the step frequency of the robot is decreased to enable the robot to reach the speed at the next moment.

In the embodiment of the present disclosure, the current speed information of the robot is acquired, the speed difference between the target speed information and the current speed information is acquired, it is determined that the robot meets the step frequency switching condition when the absolute value of the speed difference is larger than the set value, and it is determined that the robot does not meet the step frequency switching condition when the absolute value of the speed difference is less than or equal to the set value. In the embodiment of the present disclosure, the step frequency of the robot is adjusted when an absolute value of the speed difference between the speed at the next moment and the current speed of the robot is larger than the set value, thus preventing the excessively frequent adjustment of the step frequency during the walking of the robot, which otherwise will affect the normal walking of the robot.

Figure 7:
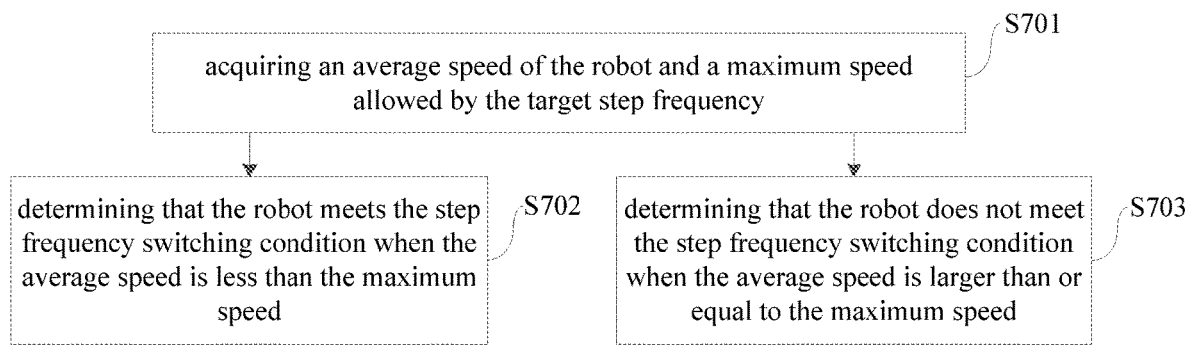
FIG. 7 is a schematic flow chart of another robot control method according to an embodiment of the present disclosure.

FIG. 7 is a schematic flow chart of a robot control method according to an embodiment of the present disclosure. On the basis of the above embodiments, yet another solution of determining whether the robot meets the step frequency switching condition is described further with reference to FIG. 7. The method includes the following steps.

At step S701, an average speed of the robot and a maximum speed allowed by the target step frequency are acquired.

During the walking of the robot at a relatively high speed, when the speed instruction changes instantaneously from the maximum speed to zero, according to the existing logic, the robot may immediately switch to a low-frequency gait. However, due to the inertia, the robot cannot complete the deceleration immediately and still has a high acceleration at this moment. In this case, if the robot changes to the low-frequency gait, the speed of the robot is still high and may exceed a maximum speed of the low-frequency gait. As a result, the swing leg cannot reach a desired landing point, and hence the robot is out of balance. Therefore, in the embodiment of the present disclosure, the average speed of the robot is taken as a basis for the step frequency switching to prevent the above problem.

The average speed represents an average value of the speeds of the robot in one step. The maximum speed allowed by the target step frequency represents a maximum speed at which the gait of the robot walking at the target step frequency can maintain balance.

At step S702, it is determined that the robot meets the step frequency switching condition when the average speed is less than the maximum speed.

At step S703, it is determined that the robot does not meet the step frequency switching condition when the average speed is larger than or equal to the maximum speed.

After the average speed of the robot and the maximum speed allowed by the target step frequency are acquired, it may be determined whether the average speed of the robot is less than the maximum speed allowed by the target step frequency. If yes, it is determined that the robot meets the step frequency switching condition, and if not, it is determined that the robot does not meet the step frequency switching condition.

In the embodiment of the present disclosure, the average speed of the robot and the maximum speed allowed by the target step frequency are acquired, it is determined that the robot meets the step frequency switching condition when the average speed is less than the maximum speed, and it is determined that the robot does not meet the step frequency switching condition when the average speed is larger than or equal to the maximum speed. In the embodiment of the present disclosure, the step frequency of the robot is adjusted only when the average speed of the robot is larger than the maximum speed allowed by the step frequency of the robot at the next moment, which can ensure the balance of the robot during the walking and prevent the robot from losing balance during the speed change.

Figure 8:
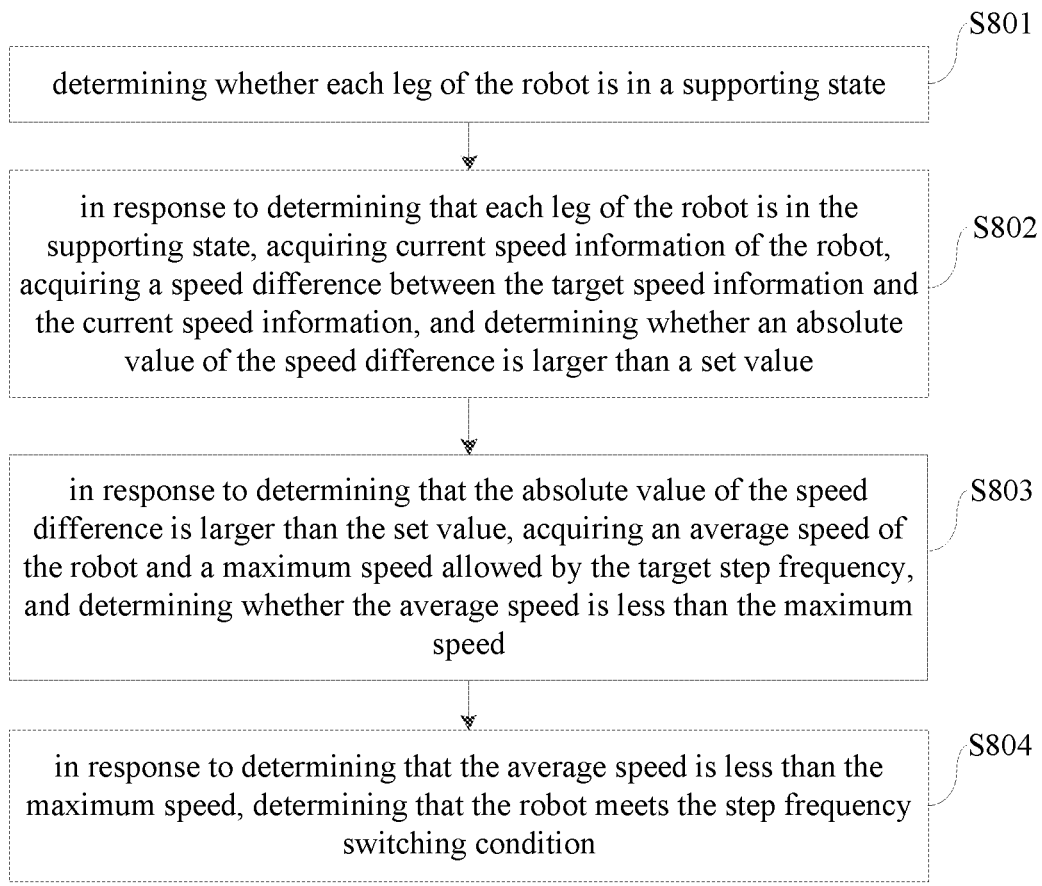
FIG. 8 is a schematic flow chart of a robot control method according to a specific example of the present disclosure.

FIG. 8 is a schematic flow chart of a robot control method according to an embodiment of the present disclosure. On the basis of the above embodiments, still another solution of determining whether the robot meets the step frequency switching condition is described further with reference to FIG. 8. The method includes the following steps.

At step S801, it is determined whether each leg of the robot is in a supporting state.

At step S802, in response to determining that each leg of the robot is in the supporting state, current speed information of the robot is acquired, a speed difference between the target speed information and the current speed information is acquired, and it is determined whether an absolute value of the speed difference is larger than a set value.

At step S803, in response to determining that the absolute value of the speed difference is larger than the set value, an average speed of the robot and a maximum speed allowed by the target step frequency are acquired, and it is determined whether the average speed is less than the maximum speed.

At step S804, in response to determining that the average speed is less than the maximum speed, it is determined that the robot meets the step frequency switching condition.

Detailed descriptions about steps S801 to S804 may be obtained with reference to the relevant introductions in the above embodiments, and will not be described herein again.

It is determined whether each leg of the robot is in the supporting state. If not, it is determined that the robot does not meet the step frequency switching condition, and if yes, the current speed information of the robot is acquired, and the speed difference between the target speed information and the current speed information is acquired. It is determined whether the absolute value of the speed difference is larger than the set value. If not, it is determined that the robot does not meet the step frequency switching condition, and if yes, the average speed of the robot and the maximum speed allowed by the target step frequency are acquired. It is determined whether the average speed is less than the maximum speed. If not, it is determined that the robot does not meet the step frequency switching condition, and if yes, it is determined that the robot meets the step frequency switching condition.

In the embodiment of the present disclosure, it is determined whether each leg of the robot is in the supporting state; in response to determining that each leg of the robot is in the supporting state, the current speed information of the robot is acquired, the speed difference between the target speed information and the current speed information is acquired, and it is determined whether the absolute value of the speed difference is larger than the set value; in response to determining that the absolute value of the speed difference is larger than the set value, the average speed of the robot and the maximum speed allowed by the target step frequency are acquired, and it is determined whether the average speed is less than the maximum speed; and in response to determining that the average speed is less than the maximum speed, it is determined that the robot meets the step frequency switching condition.

In the embodiment of the present disclosure, the step frequency of the robot is adjusted only when each leg of the robot is in the supporting state, the difference between the speed at the next moment and the current speed of the robot is larger than the set value, and the average speed of the robot is larger than the maximum speed allowed by the step frequency of the robot at the next moment, which can ensure the stability and continuity of the walking of the robot, can prevent an abrupt change in the foot track during the walking, which otherwise will affect the stability and continuity of the walking of the robot, can prevent the excessively frequent adjustment of the step frequency during the walking of the robot, which otherwise will affect the normal walking of the robot, and can also ensure the balance of the robot during the walking and prevent the robot from losing balance during the speed change.

In conclusion, to determine whether the robot meets the step frequency switching condition, the following three judgment conditions are included.

In Condition 1, it is determined whether each leg of the robot is in the supporting state.

In Condition 2, it is determined whether the absolute value of the speed difference between the target speed information and the current speed information of the robot is larger than the set value.

In Condition 3, it is determined whether the average speed of the robot is less than the maximum speed allowed by the target step frequency.

As a possible implementation, in addition to the four judgment solutions described in the four embodiments provided in FIG. 3 to FIG. 8, Condition 1 and Condition 2, Condition 2 and Condition 3, and Condition 1 and Condition 3 may be combined to form other three different judgment solutions. Specific processes of these combinations may be obtained with reference to the relevant descriptions of the above embodiments, and will not be described herein again.

Figure 9:
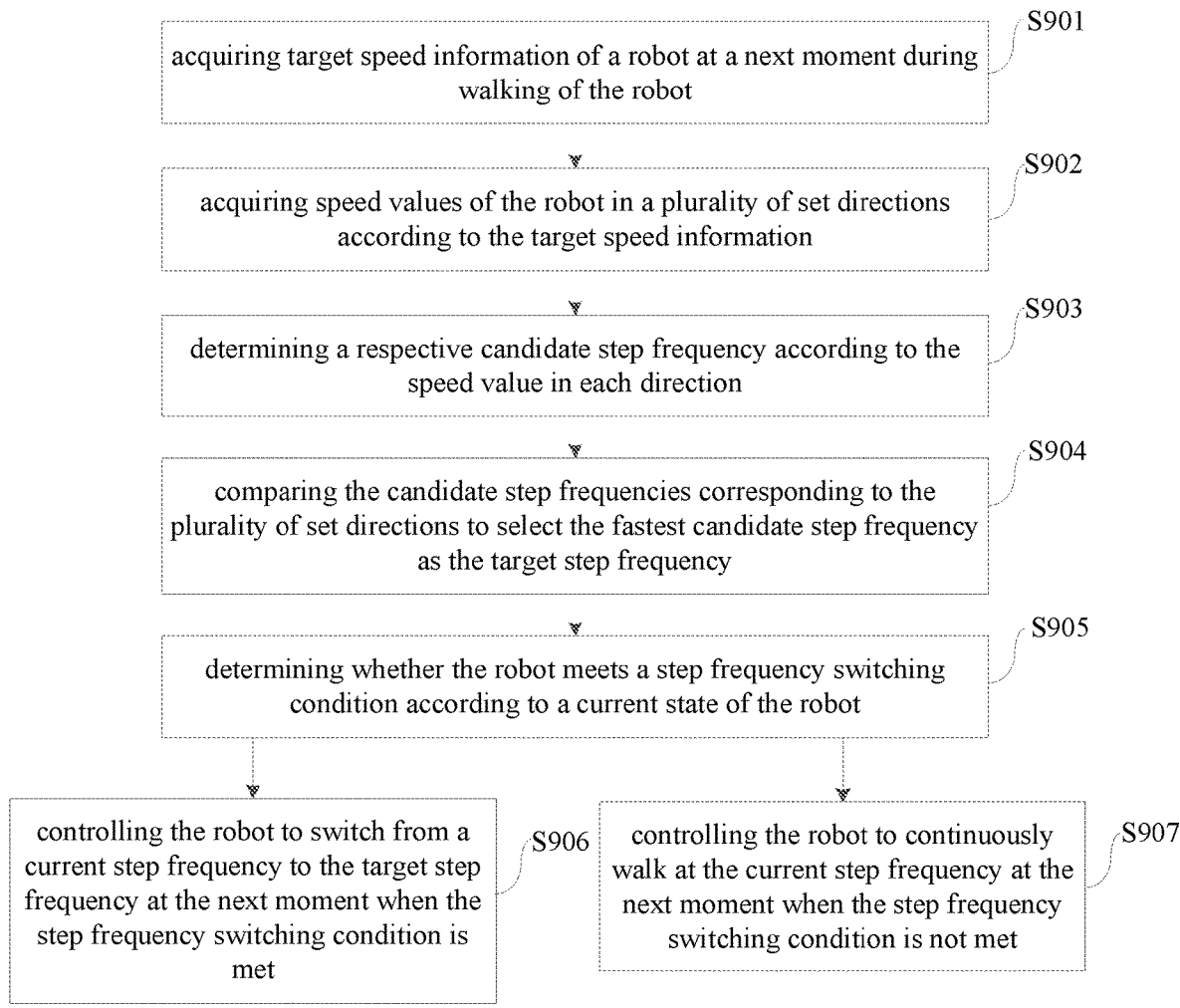
FIG. 9 is a schematic flow chart of a robot control method according to a specific example of the present disclosure.

FIG. 9 is a schematic flow chart of a robot control method according to an embodiment of the present disclosure. As shown in FIG. 9, the method includes the following steps.

At step S901, target speed information of a robot at a next moment is acquired during walking of the robot.

Detailed descriptions about step S901 may be obtained with reference to the relevant introductions in the above embodiments, and will not be described herein again.

At step S902, speed values of the robot in a plurality of set directions are acquired according to the target speed information.

Figure 10:
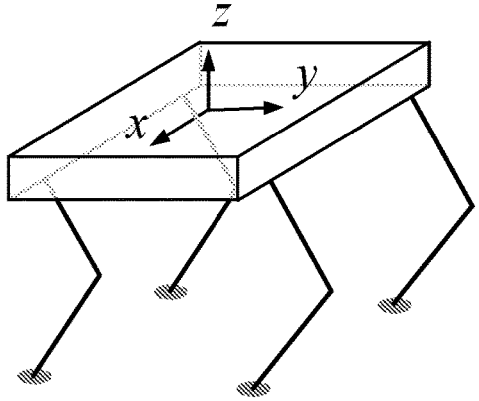
FIG. 10 is a schematic view of a walking direction of a robot.

In some embodiments, as shown in FIG. 10, the plurality of set directions of the robot may include a x direction, a y direction, and a yaw direction. The yaw direction represents a rotation direction around a z axis. Speed values of the robot in the x direction, the y direction, and the yaw direction may be acquired respectively according to the target speed information.

At step S903, a respective candidate step frequency is determined according to the speed value in each direction.

In some embodiments, candidate step frequencies in the x direction, the y direction, and the yaw direction are determined respectively according to the speed values in the x direction, the y direction, and the yaw direction.

At step S904, the candidate step frequencies corresponding to the plurality of set directions are compared to select the fastest candidate step frequency as the target step frequency.

In some embodiments, the candidate step frequencies in the x direction, the y direction, and the yaw direction may be compared to select the fastest step frequency as the target step frequency.

For example, when the speed values in the x direction and the y direction are smaller and the corresponding candidate step frequencies are both 1/600 ms, and the speed value in the yaw direction is larger and the corresponding candidate step frequency is 1/300 ms, 1/300 ms is taken as the target step frequency.

At step S905, it is determined whether the robot meets a step frequency switching condition according to a current state of the robot.

At step S906, the robot is controlled to switch from a current step frequency to the target step frequency at the next moment when the step frequency switching condition is met.

At step S907, the robot is controlled to continuously walk at the current step frequency at the next moment when the step frequency switching condition is not met.

Detailed descriptions about steps S905 to S907 may be obtained with reference to the introductions in the above relevant embodiments, and will not be described herein again.

In the embodiment of the present disclosure, the target speed information of the robot at the next moment is acquired during the walking of the robot, the speed values of the robot in the plurality of set directions are acquired according to the target speed information, the respective candidate step frequency is determined according to the speed value in each direction, the candidate step frequencies corresponding to the plurality of set directions are compared to select the fastest candidate step frequency as the target step frequency, it is determined whether the robot meets the step frequency switching condition according to the current state of the robot, the robot is controlled to switch from the current step frequency to the target step frequency at the next moment when the step frequency switching condition is met, and the robot is controlled to continuously walk at the current step frequency at the next moment when the step frequency switching condition is not met.

In the embodiment of the present disclosure, since the plurality of set directions of the robot are decoupled, selecting the fastest candidate step frequency from the candidate step frequencies of the plurality of set directions of the robot as the target step frequency of the robot can ensure that motions of the robot in the plurality of set directions can all be executed.

Figure 11:
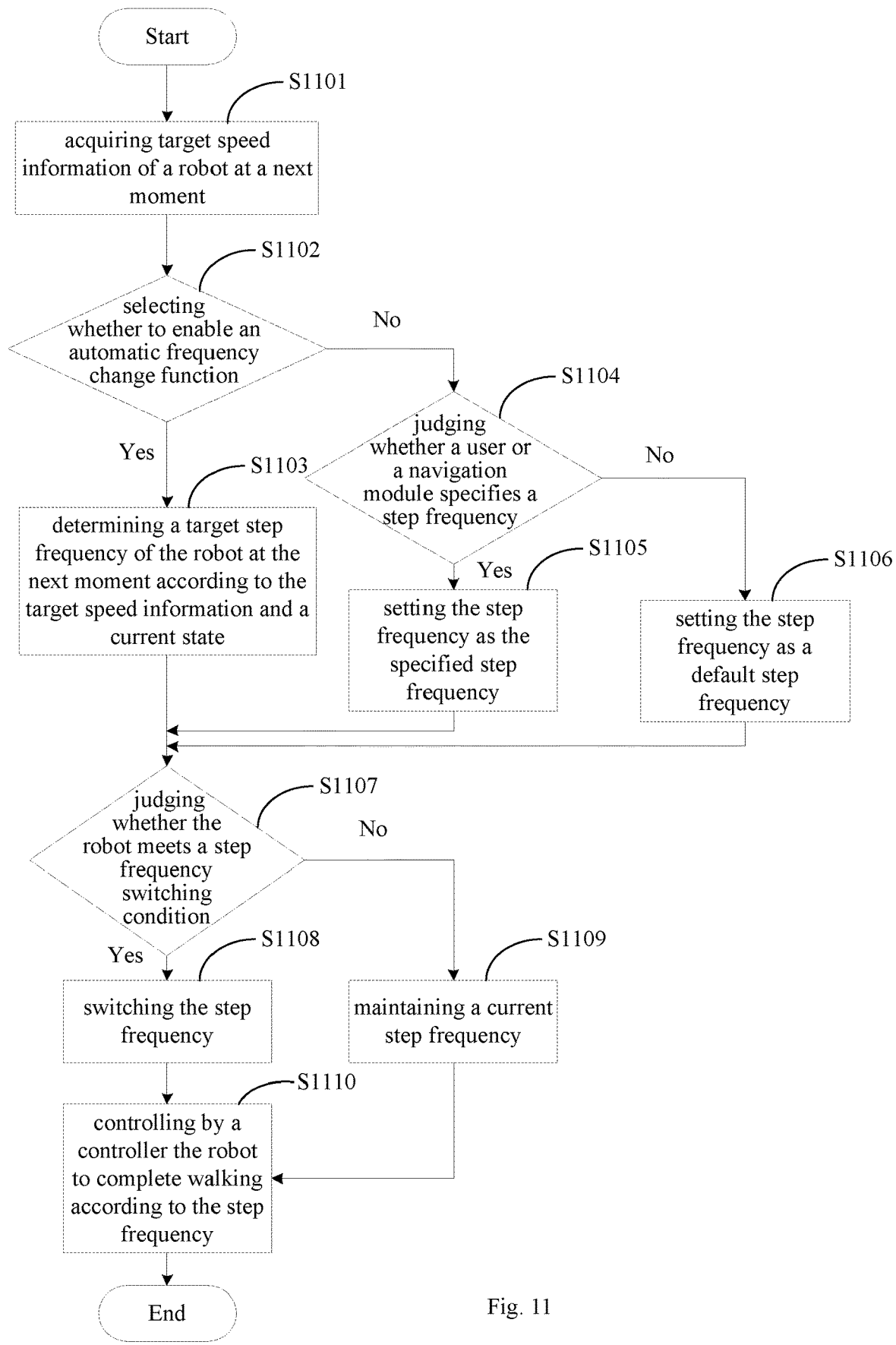
FIG. 11 is a schematic flow chart of an application of a robot control method.

In order to allow those skilled in the art to understand the present disclosure more clearly, FIG. 11 is a schematic flow chart of an actual application of a robot control method according to an embodiment of the present disclosure. As shown in FIG. 11, the method includes the following steps.

At step S1101, target speed information of a robot at a next moment is acquired.

At step S1102, it is selected whether an automatic frequency change function is enabled. If yes, step S1103 is executed. If not, step S1104 is executed.

At step S1103, a target step frequency of the robot at the next moment is determined according to the target speed information and a current state.

At step S1104, it is judged whether a user or a navigation module specifies a step frequency. If yes, step S1105 is executed. If not, step S1106 is executed.

At step S1105, the step frequency is set as the specified step frequency.

At step S1106, the step frequency is set as a default step frequency.

At step S1107, it is judged whether the robot meets a step frequency switching condition. If yes, step S1108 is executed. If not, step S1109 is executed.

At step S1108, the step frequency is switched.

At step S1109, a current step frequency is maintained.

At step S1110, a controller controls the robot to complete walking according to the step frequency.

Figure 12:
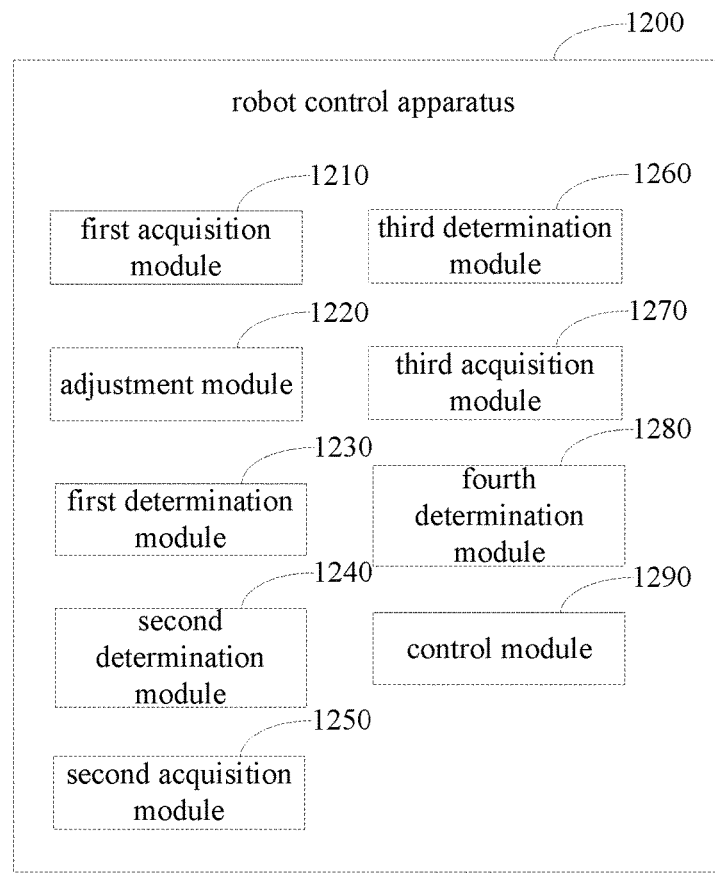
FIG. 12 is a schematic diagram of a robot control apparatus according to an embodiment of the present disclosure.

In order to implement the above embodiments, an embodiment of the present disclosure further provides a robot control apparatus. FIG. 12 is a schematic diagram of a robot control apparatus according to an embodiment of the present disclosure. As shown in FIG. 12, the robot control apparatus 1200 includes a first acquisition module 1210 configured to acquire target speed information of a robot at a next moment during walking of the robot; and an adjustment module 1220 configured to adjust a step frequency of the robot according to the target speed information and a current state of the robot.

In an embodiment of the present disclosure, the adjustment module 1220 is further configured to: determine a target step frequency of the robot at the next moment according to the target speed information; determine whether the robot meets a step frequency switching condition according to the current state of the robot; and control the robot to switch from a current step frequency to the target step frequency at the next moment when the step frequency switching condition is met.

In an embodiment of the present disclosure, the robot control apparatus 1200 further includes: a first determination module 1230 configured to determine whether each leg of the robot is in a supporting state; and a second determination module 1240 configured to determine that the robot meets the step frequency switching condition when each leg of the robot is in the supporting state.

In an embodiment of the present disclosure, the first determination module 1230 is further configured to: determine a landing moment at which all the legs of the robot land according to the current step frequency of the robot; and determine that each leg of the robot is in the supporting state in response to that a current moment of the robot reaches the landing moment.

In an embodiment of the present disclosure, the first determination module 1230 is further configured to: acquire pressure data of each leg of the robot; and determine that each leg of the robot is in the supporting state in response to that the pressure data of each leg is larger than a set pressure value.

In an embodiment of the present disclosure, the robot control apparatus 1200 further includes: a second acquisition module 1250 configured to acquire current speed information of the robot, and acquire a speed difference between the target speed information and the current speed information; and a third determination module 1260 configured to determine that the robot meets the step frequency switching condition when an absolute value of the speed difference is larger than a set value.

In an embodiment of the present disclosure, the robot control apparatus 1200 further includes: a third acquisition module 1270 configured to acquire an average speed of the robot and a maximum speed allowed by the target step frequency; and a fourth determination module 1280 configured to determine that the robot meets the step frequency switching condition when the average speed is less than the maximum speed.

In an embodiment of the present disclosure, the robot control apparatus 1200 further includes: a control module 1290 configured to control the robot to continuously walk at the current step frequency at the next moment when the step frequency switching condition is not met.

In an embodiment of the present disclosure, the adjustment module 1220 is further configured to: acquire speed values of the robot in a plurality of set directions according to the target speed information; determine a respective candidate step frequency according to the speed value in each direction; and compare the candidate step frequencies corresponding to the plurality of set directions to select the fastest candidate step frequency as the target step frequency.

It is to be noted that the foregoing explanations of the embodiments of the robot control method also apply to the robot control apparatus in the embodiment, and will not be described herein again.

In the embodiment of the present disclosure, the target speed information of the robot at the next moment is acquired during the walking of the robot, and the step frequency of the robot is adjusted according to the target speed information and the current state of the robot. In the embodiment of the present disclosure, during the walking of the robot, when the speed needs to be changed, the robot can automatically adjust the step frequency according to the speed at the next moment and the current state, so as to change a walking speed to meet a requirement of a variable-speed walking scenario.

According to an embodiment of the present disclosure, an electronic device is further provided, and includes: a processor; and a memory configured to store an instruction executable by the processor. The processor is configured to execute the instruction to implement the robot control method as described above.

In order to implement the above embodiment, the present disclosure further provides a storage medium.

An instruction in the storage medium, when executed by a processor of an electronic device, enables the electronic device to perform the robot control method as described above.

In order to implement the above embodiments, an embodiment of the present disclosure further provides a robot, including the robot control apparatus according to the embodiment of the second aspect of the present disclosure or the electronic device according to the embodiment of the third aspect of the present disclosure, so as to implement the robot control method according to the embodiment of the first aspect of the present disclosure.

Figure 13:
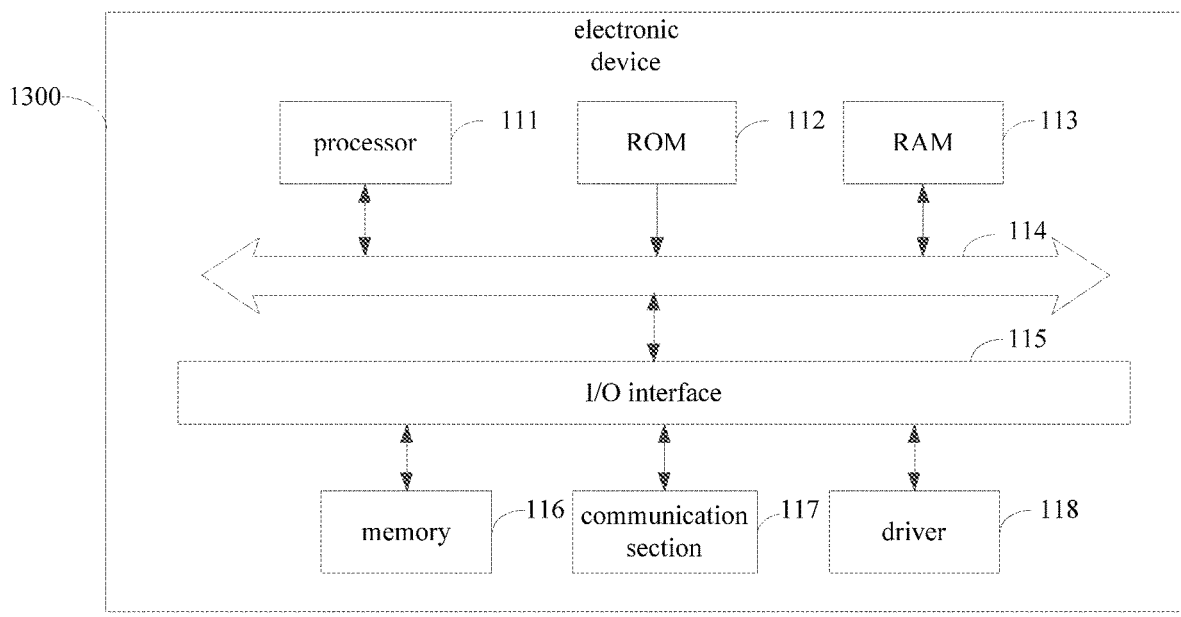
FIG. 13 is a schematic diagram of an electronic device according to an embodiment of the present disclosure.

FIG. 13 is a block diagram of an electronic device according to an illustrative embodiment. The electronic device shown in FIG. 13 is only an example, and should not limit the function and application scope of the embodiment of the present disclosure in any way.

As shown in FIG. 13, the electronic device 1300 includes a processor 111, which may perform various appropriate actions and processes in accordance with a program stored in a read-only memory (ROM) 112 or a program loaded into a random access memory (RAM) 113 from a memory 116. The RAM 113 also stores various programs and data required by operations of the electronic device 1300. The processor 111, the ROM 112, and the RAM 113 are connected to one another through a bus 114. An input/output (I/O) interface 115 is also connected to the bus 114.

The following components are connected to the I/O interface 115: the memory 116 including a hard disk or the like; and a communication section 117 including a network interface card such as a Local Area Network (LAN) card, a modem, or the like. The communication section 117 performs communication processing via a network such as the Internet. A driver 118 is also connected to the I/O interface 115 as required.

In an illustrative embodiment, according to the embodiment of the present disclosure, the process described above with reference to the flow chart can be implemented as a computer software program. For example, the embodiment of the present disclosure includes a computer program carried on a computer-readable medium. The computer program includes a program code for performing the method shown in the flow chart. In such an embodiment, the computer program may be downloaded and installed from the network through the communication section 117. When the computer program is executed by the processor 111, the above functions defined in the method of the present disclosure are performed.

In an illustrative embodiment, a storage medium including an instruction is further provided, such as a memory including an instruction, and the foregoing instruction may be executed by the processor 111 of the electronic device 1300 to complete the foregoing method. In some embodiments, the storage medium may be a non-transitory computer-readable storage medium. For example, the non-transitory computer-readable storage medium may be an ROM, an RAM, a Compact Disc Read-Only Memory (CD-ROM), a magnetic tape, a floppy disk, and an optical data storage device, etc.

In the present disclosure, a computer-readable storage medium may be any tangible medium that includes or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried in the data signal. The propagated data signal may have many forms, including but not limited to, an electromagnetic signal, an optical signal, or any suitable combination thereof. The computer-readable signal medium may also be any computer-readable medium other than the computer-readable storage medium. The computer-readable medium may send, propagate, or transmit the program for use by or in combination with the instruction execution system, apparatus, or device. The program code included in the computer-readable medium may be transmitted by any suitable medium, including but not limited to, a radio, an electric wire, an optical cable, RF, etc., or any suitable combination thereof.

Other implementations of the present disclosure will be apparent to those skilled in the art from consideration of the specification and practice of the invention disclosed here. The present disclosure is intended to cover any variations, uses, or adaptations of the present invention. Such variations, uses, or adaptations follow the general principle of the present disclosure and include the common knowledge or customary technical means in the art not disclosed in the present disclosure. The specification and embodiments are considered as illustrative only, and the true scope and spirit of the present disclosure are indicated by the following claims.

It will be appreciated that the present disclosure is not limited to the exact structure that has been described above and illustrated in the accompanying drawings, and that various modifications and changes may be made without departing from the scope thereof. The scope of the present disclosure is only limited by the appended claims.

What is claimed is:

1. A robot control method, comprising:
   acquiring target speed information of a robot at a next moment during walking of the robot; and
   adjusting a step frequency of the robot according to the target speed information and a current state of the robot, wherein the current state of the robot comprises at least one of a limb state, a speed state, and a pose state of the robot,
   wherein adjusting a step frequency of the robot according to the target speed information and a current state of the robot comprises:
   determining a target step frequency of the robot at the next moment according to the target speed information;
   determining whether the robot meets a step frequency switching condition according to the current state of the robot; and
   controlling the robot to switch from a current step frequency to the target step frequency at the next moment in response to that the step frequency switching condition is met.

2. The method according to claim 1, further comprising:
   determining whether each leg of the robot is in a supporting state; and
   determining that the robot meets the step frequency switching condition in response to that each leg of the robot is in the supporting state.

3. The method according to claim 2, wherein determining whether each leg of the robot is in a supporting state comprises:
   determining a landing moment at which all the legs of the robot land according to the current step frequency of the robot; and
   determining that each leg of the robot is in the supporting state in response to that a current moment of the robot reaches the landing moment.

4. The method according to claim 2, wherein determining whether each leg of the robot is in a supporting state comprises:
   acquiring pressure data of each leg of the robot; and
   determining that each leg of the robot is in the supporting state in response to that the pressure data of each leg is larger than a set pressure value.

5. The method according to claim 1, further comprising:
   acquiring current speed information of the robot, and acquiring a speed difference between the target speed information and the current speed information; and
   determining that the robot meets the step frequency switching condition in response to that an absolute value of the speed difference is larger than a set value.

6. The method according to claim 1, further comprising:
   acquiring an average speed of the robot and a maximum speed allowed by the target step frequency; and
   determining that the robot meets the step frequency switching condition in response to that the average speed is less than the maximum speed.

7. The method according to claim 1, further comprising:
   controlling the robot to continuously walk at the current step frequency at the next moment in response to that the step frequency switching condition is not met.

8. The method according to claim 1, wherein determining a target step frequency of the robot at the next moment according to the target speed information comprises:
   acquiring speed values of the robot in a plurality of set directions according to the target speed information;
   determining a respective candidate step frequency according to the speed value in each direction; and
   comparing the candidate step frequencies corresponding to the plurality of set directions, to select the fastest candidate step frequency as the target step frequency.

9. A robot control apparatus, comprising:
   a processor; and
   a memory configured to store an instruction executable by the processor,
   wherein the processor is configured to execute the instruction to:
   acquire target speed information of a robot at a next moment during walking of the robot; and
   adjust a step frequency of the robot according to the target speed information and a current state of the robot, wherein the current state of the robot comprises at least one of a limb state, a speed state, and a pose state of the robot,
   the processor is further configured to execute the instruction to:
   determine a target step frequency of the robot at the next moment according to the target speed information;
   determine whether the robot meets a step frequency switching condition according to the current state of the robot; and control the robot to switch from a current step frequency to the target step frequency at the next moment in response to that the step frequency switching condition is met.

10. The apparatus according to claim 9, wherein the processor is further configured to execute the instruction to:
determine whether each leg of the robot is in a supporting state; and
determine that the robot meets the step frequency switching condition in response to that each leg of the robot is in the supporting state.

11. The apparatus according to claim 10, wherein the processor is further configured to execute the instruction to:
determine a landing moment at which all the legs of the robot land according to the current step frequency of the robot; and
determine that each leg of the robot is in the supporting state in response to that a current moment of the robot reaches the landing moment.

12. The apparatus according to claim 10, wherein the processor is further configured to execute the instruction to;
acquire pressure data of each leg of the robot; and
determine that each leg of the robot is in the supporting state in response to that the pressure data of each leg is larger than a set pressure value.

13. The apparatus according to claim 9, wherein the processor is further configured to execute the instruction to:
a second acquisition module configured to acquire current speed information of the robot, and acquire a speed difference between the target speed information and the current speed information; and
a third determination module configured to determine that the robot meets the step frequency switching condition in response to that an absolute value of the speed difference is larger than a set value.

14. The apparatus according to claim 9, wherein the processor is further configured to execute the instruction to:
acquire an average speed of the robot and a maximum speed allowed by the target step frequency; and
determine that the robot meets the step frequency switching condition in response to that the average speed is less than the maximum speed.

15. The apparatus according to claim 9, wherein the processor is further configured to execute the instruction to:
a control module configured to control the robot to continuously walk at the current step frequency at the next moment in response to that the step frequency switching condition is not met.

16. The apparatus according to claim 9, wherein the processor is further configured to execute the instruction to:
acquire speed values of the robot in a plurality of set directions according to the target speed information;
determine a respective candidate step frequency according to the speed value in each direction; and
compare the candidate step frequencies corresponding to the plurality of set directions, select the fastest candidate step frequency as the target step frequency.

\* \* \* \* \*